July 4, 1944.  F. A. WHITELEY  2,352,748
COOLING AIR CONDITIONER
Filed Aug. 30, 1943  3 Sheets-Sheet 1
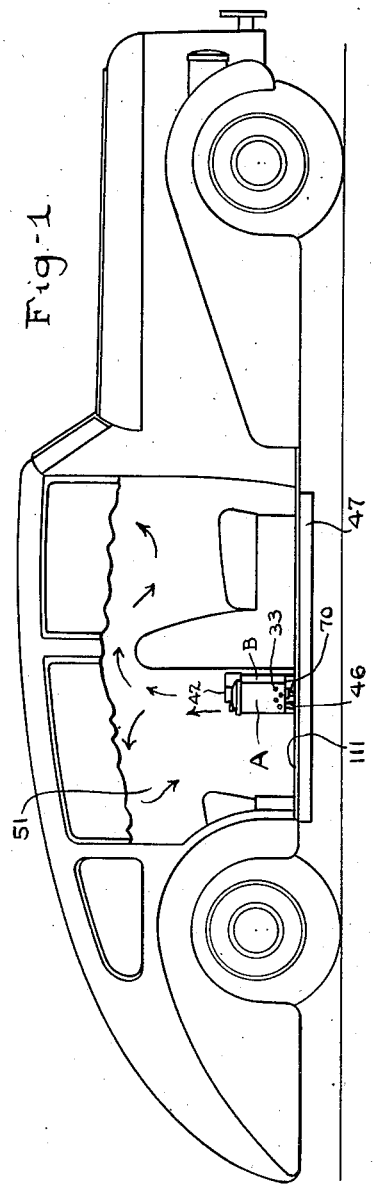
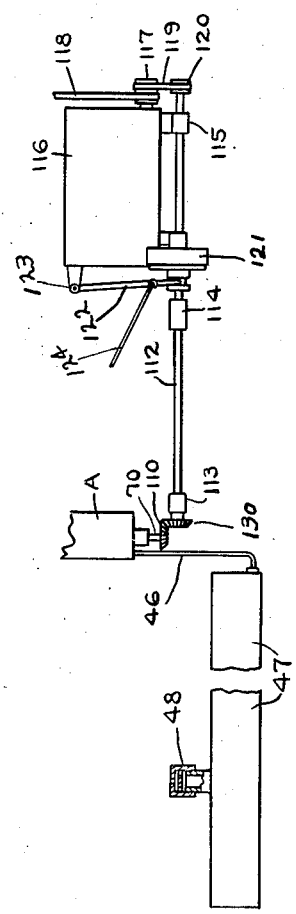
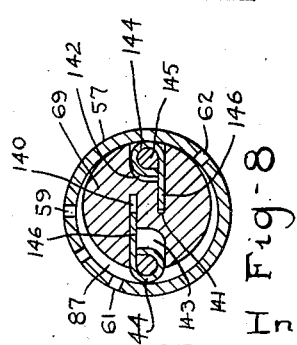
Inventor:
F. A. Whiteley.
By
Attorney.

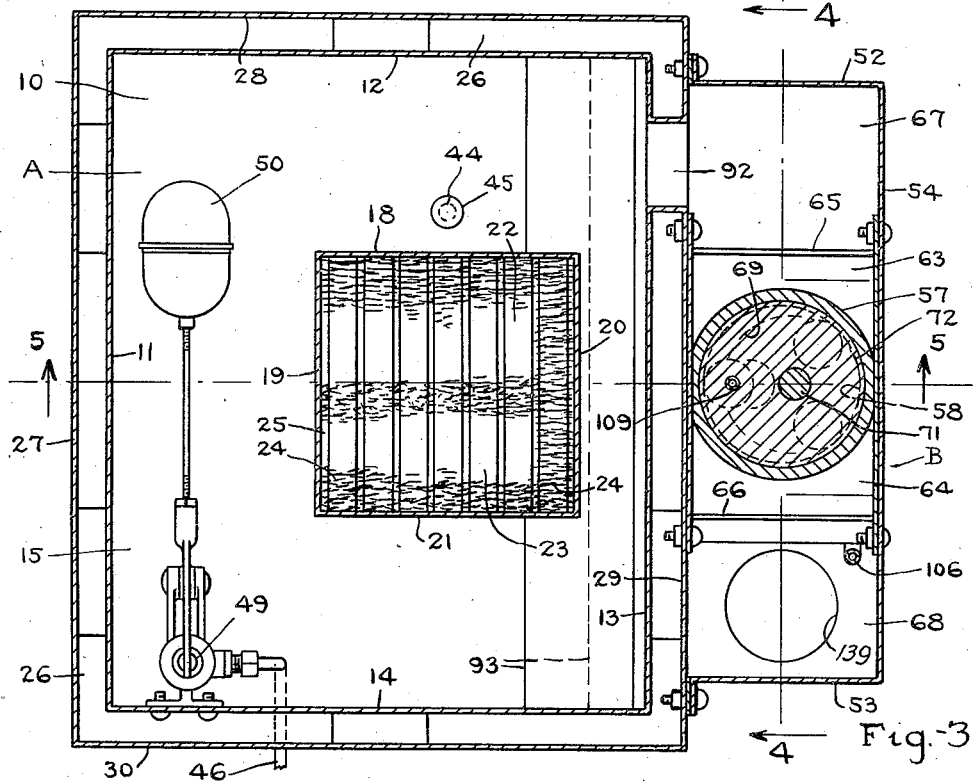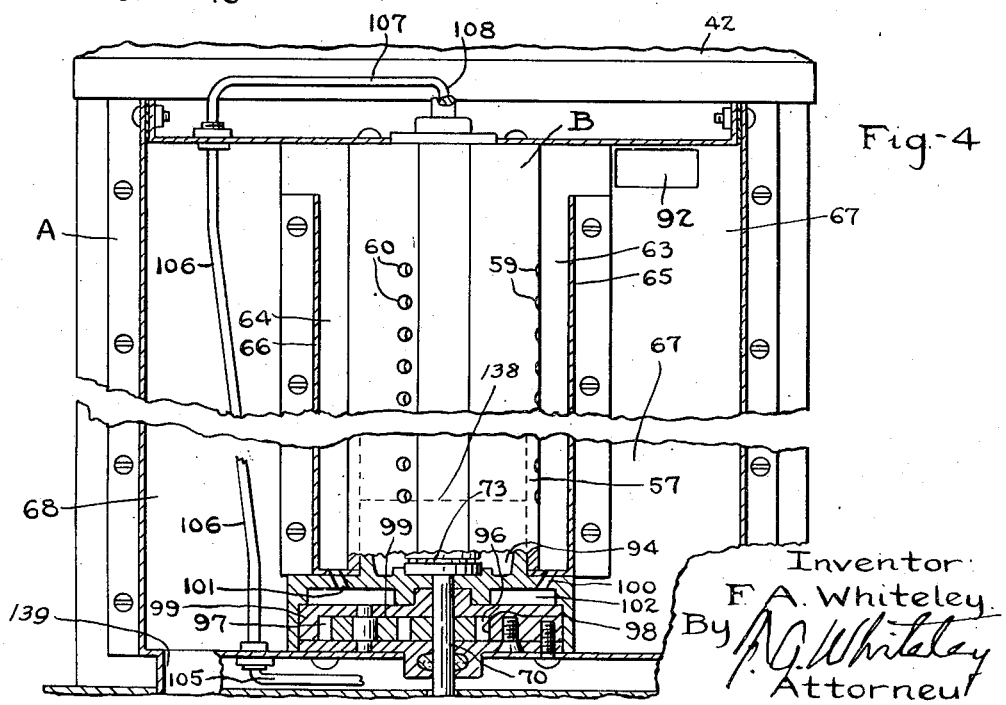

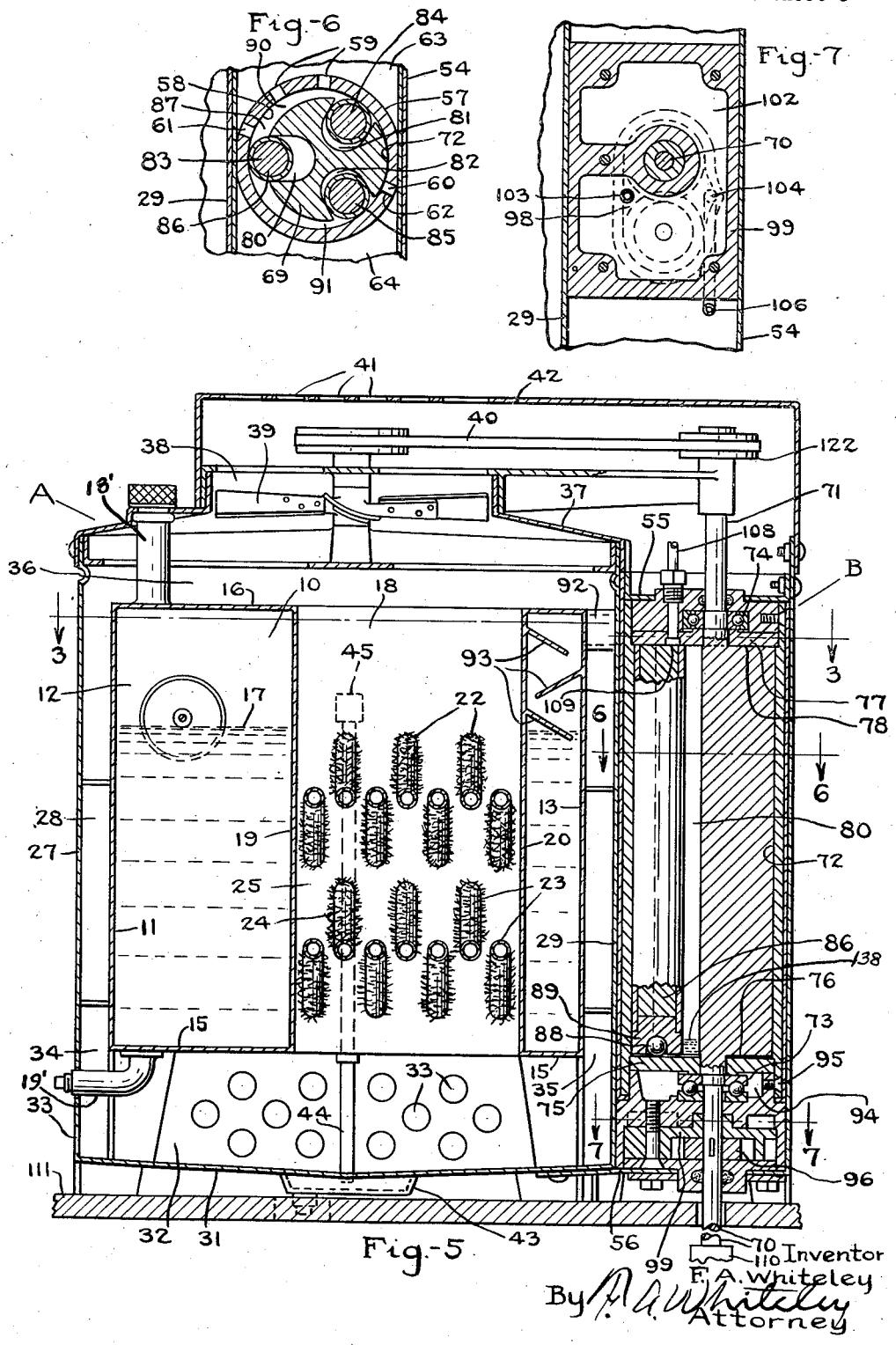

Patented July 4, 1944

2,352,748

UNITED STATES PATENT OFFICE 2,352,748

COOLING AIR CONDITIONER

Frank A. Whiteley, Minneapolis, Minn.

Application August 30, 1943, Serial No. 500,729

10 Claims. (Cl. 62—152)

My invention relates to cooling air conditioners, and has for its object to provide a cooling air conditioner wherein a requisite degree of vacuum is obtained by mechanical means in a container of water to cause said water to boil, thereby drawing the heat of vaporization from its surroundings including the water itself and to provide heat exchanger means in connection with said cooled water, and air moving means so that a stream of cooled air may thus be obtained. Although my invention is adapted for various uses where it is desired to produce cooled air, it is of particular usefulness as a cooling air conditioner for automobile compartments.

It is well known that the compartments of automobiles are air conditioned in cool and cold weather to render them comfortably warm for riding, and efforts have been made to find means for cooling air conditioning of the interior of automobile compartments during warm or hot weather. A principal difficulty encountered heretofore has been that such cooling by compressors at the same time required an amount of power in excess of what the gas motor should be called upon to use for that purpose and such appliances have been too expensive and too bulky. My invention will effectively meet these difficulties by providing a small compact unit which can be positioned at any convenient place inside the automobile compartment, preferably upon the floor just back of the rear seat, which embodies as a mechanical part a simple rotor and connections for rotating it to the jack shaft of the automobile, and which will be inexpensive to construct and hence can be sold at a price the driving public can afford to pay.

It is an object of my invention, therefore, to provide in association with a tank for holding a body of water, means for rapidly withdrawing air from said tank and discharging it out-of-doors, preferably through the bottom of the automobile compartment, whereby a sufficient vacuum is produced within the tank and above the surface of the water therein to produce a boiling of said water and hence, the withdrawal of heat whereby the water itself is cooled and air circulating about the tank is also cooled.

Since the cooling is effected by the evaporation of water, it is an object of my invention to provide means for automatically injecting water into the evaporation tank whenever it reaches a predetermined low level.

It is a further object of my invention to cause the air currents to move about the evaporation tank and through a passageway having heat exchanger members therein which extends vertically through the evaporation tank, whereby the air is cooled and moisture condensed therefrom, and it is a part of my invention to provide means for accumulating said condensed moisture and causing it to be injected into the evaporating chamber together with some air whenever the pressure within the chamber reaches a predetermined low point.

In its preferred form, the air pump comprises a rotating member eccentrically positioned in a hollow cylinder, said member formed with a series of radial longitudinal slots, with weighted cylindrical members, such as tubes filled with lead, operating radially in said slots, so that as the member is rotated the tubes will be caused by centrifugal force to contact the walls of the eccentrically-positioned cylinder thus operating first to gather a charge of rarified air from the evaporating chamber, and then to discharge this air against external air pressure and the heat which will be accumulated to outside atmosphere, preferably, when the device is used for automobiles, through the floor of the automobile.

It is a further object of my invention to provide means for oiling the walls of the slots, the cylindrical members operating therein and the inner wall of the eccentrically-disposed fixed cylinder and of causing sufficient circulation of said oil so that at all times there is an oil film having the effect of both eliminating friction in the operation of the device and preventing leakage of air from the positive pressure side to the negative pressure side of the apparatus.

The full objects and advantages of my invention are detailed in the following specification, and the novel features thereof by which are obtained the advantageous results from the use of the invention will be particularly pointed out in the claims.

In the drawings:

Fig. 1 is a diagram of a compartment of an automobile, showing the position of the air conditioner therein and of an auxiliary water tank for supplying water thereto.

Fig. 2 is a diagrammatic showing of the power means and of the water supply tank.

Fig. 3 is a sectional plan view taken on line 3—3 of Fig. 5.

Fig. 4 is a sectional elevation view taken on line 4—4 of Fig. 3.

Fig. 5 is a vertical sectional view through the apparatus on line 5—5 of Fig. 3.

Fig. 6 is a sectional plan view of a portion of the apparatus taken on line 6—6 of Fig. 5.

Fig. 7 is a similar sectional view of a portion of the apparatus taken on line 7—7 of Fig. 5.

Fig. 8 is a sectional view similar to the view of Fig. 6, showing a modified form of rotor and beaters.

Referring to Figs. 1 and 5, the cooling air conditioning unit is designated as A. It comprises a water-holding tank compartment formed of a series of inner side walls 11, 12, 13, and 14, a bottom wall 15, and a top wall 16. These walls enclose a chamber 10, rectangular in shape and which is adapted to hold water at a level indicated at 17 in Fig. 5, which water will be vaporized by the means provided as hereinafter pointed out.

A set of side walls 18, 19, 20, and 21, extend between the top wall 16 and the bottom wall 15 and open through them to form a preferably square passageway up through the chamber. Positioned therein are sets of heat exchanger pipes 22 and 23. These pipes all extend across between the side walls 18 and 21, Fig. 3, and open at their respective ends into the water compartment 10. As shown in Fig. 5, the pipes 22 slope upward between these walls in one direction and the pipes 23 slope upward between the other walls in the opposite direction. These pipes are of a standard construction provided with integral fins all around them as indicated at 24 in Fig. 3, and thus have a large exposure of heat exchange surface to the current of air caused to pass upwardly through the vertical heat exchange passageway 25. Preferably the heat exchange area will be multiplied by putting in two or more tiers of such heat exchange pipes as indicated in Fig. 3.

The walls 11, 12, 13, and 14 of water-holding tank compartment 10, as well as the inner walls 18, 19, 20, and 21 of the heat exchange passageway 25 will be formed of heavy plate, preferably of good heat-conducting material, such as copper or brass, and heavy enough to resist the external air pressure when the desired vacuum is built up inside of the tank compartment 10. Surrounding the walls 11, 12, 13, and 14 and spaced a suitable distance therefrom, as indicated at 26, Fig. 3, are a series of side walls 27, 28, 29, and 30. These walls, Fig. 5, extend a desired distance below the bottom 15 of tank 10 and are supported upon and formed in connection with a bottom wall 31, thus providing a chamber 32 below the bottom 15 of tank 10. The lower part of each of the walls 27, 28, and 30, is provided with perforations 33, as clearly shown in Fig. 5, thus opening the chamber 32 to the space within the chamber or compartment to be cooled. As indicated at 34 and 35, the space 26 outside and about the tank compartment 10 is in communication at its lower end with the chamber 32.

Above the wall 16 an upper chamber 36 is provided by upward extensions of walls 27, 28, 29, and 30, and a cap member 37, which in turn is formed with upwardly beveled walls and a central fan opening 38 in which operates a fan 39 driven by a belt 40 as will later be described.

It will be apparent from the above that all of the walls of the tank compartment 10 and of the heat exchange passageway 25 are exposed to a current of air passing through passageway 25 and the passageways 26 and that also the heat exchange pipes 21 and 22 are similarly exposed to this current of air, which will be drawn through and over these heat exchange surfaces and be discharged through opening 38 and openings 41 in a protective top grill member 42. The pipes 23 will be filled with the cooled water and in taking up the heat the water in said pipes, because of their upward slope, will cause a circulation through the pipes, the warm water therein discharging at the upper end while cold water moves downwardly also from the upper end, thus insuring efficient distribution of the cold water within the tank without the use of any pump or other moving means.

As clearly shown in Fig. 5, the bottom member 31 slopes so as to carry the water condensed from the air into a sump 43. Since the automobile compartment will be kept closed under the cooling operation, there will necessarily be considerable moisture in the air inside of the automobile, and it will be continuously condensed on the heat exchange passageways and will gravitate down into sump 43. A pipe 44 leads from sump 43 to a point toward the top of the tank compartment 10, where a pressure valve, indicated in dotted lines diagrammatically at 45, Fig. 5, when the inside pressure is brought down to a predetermined point and the relative outside air pressure is correspondingly raised, will open the pipe 44, which will result in first forcing all of the water in and about sump 43 into the tank compartment 10, and then will permit enough air to enter the tank compartment to sufficiently raise the pressure within the tank compartment. This will take place periodically as fast as pressure in the tank compartment is sufficiently lowered and will aid in restoring to the tank compartment some part of the water evaporated by the means hereinafter described.

For additional water, a pipe 46, Figs. 1 and 3, leads to a water tank 47, Fig. 1, supported on the under part of the framework of the automobile. As indicated at 48, the inside of this tank is at all times open to atmosphere. The pipe 46 goes to a shut-off valve 49 controlled by a float 50 in a well known way. It follows that whenever the water at 17 drops below the desired level the valve 49 will be opened and air pressure upon the water in the tank 47 will force water through valve 49 and into tank compartment 10 until the working level has been restored. A filling plug 18' and a drain-out plug 19' are shown in Fig. 5.

The arrangement of air conditioner member A and the tank 47 in relation to an automobile body is illustrated in Figs. 1 and 2, from which it will be apparent, as the arrows show, that the circulation of air in the compartment 51 of the automobile forces the cold air to the upper part of the compartment where it circulates and settles to the bottom to be again drawn into the cooling air conditioner and be re-circulated, thus cooling all parts of the automobile compartment. As above stated, the water in tank 47 is subject to pressure of the outside air which is ample to force the water into the tank compartment 10 whenever the valve 49 is opened.

Means for exhausting air from the tank compartment 10 to produce the degree of vacuum necessary to boil the water and extract the heat from the water itself and surrounding medium is designated generally as B and is clearly illustrated in Figs. 3, 4, 5, and 6. As shown in Fig. 6, a casing extension outside of wall 29 is provided which is formed of end walls 52 and 53, a side wall 54 and top and bottom walls 55 and 56.

Midway between end walls 52 and 53, Fig. 3, and sealed to them along diametrically opposed lines, is positioned a cylinder 57 which is held rigidly in a vertical position and has its inner wall 58 milled to a true and smooth cylindrical surface. The cylinder is provided with a series of apertures 59 and 60 on opposite sides thereof, some of the apertures 59 as at 61, being close to the point of union of the cylinder wall with the wall member 29 and the apertures 60 as at 62 being in a diametrically opposite position close to the union of the cylinder wall with the wall 54. The space within the walls 52, 53, 54, and 29 is thus divided into two longitudinal compartments 63 and 64. Vertical walls 65 and 66 which extend to a point substantially below the top of cylinder 57, Fig. 4, further divide this space into two additional end compartments 67 and 68, Fig. 3.

Within the cylinder 57 is located a rotor 69 which extends vertically through the chamber inside the cylinder 57 and has its central axis axially mounted upon lower and upper shaft extensions 70 and 71, Fig. 5. The rotor 69 is of substantially smaller outside diameter than the inner diameter of cylinder 57 and the shafts 70 and 71 are eccentrically positioned as to the axis of cylinder 57 so as to bring the outer wall of the rotor 69 substantially into contact with one side of the inner wall 58 of cylinder 57, as indicated at 72, Figs. 3, 5, and 6. The shaft 70 extends through a roller thrust bearing 73 which supports the rotor 69, and the shaft 71 extends through roller bearing 74, whereby the rotor 69 is supported for easy rotation. The interior of cylinder 57 is closed at its bottom by a rigid plate member 75 which is preferably of hard steel with its upper face brought into a smooth plane surface 76. The upper part of the interior of cylinder 57 is closed by a rigid plate 77 which has its bottom surface 78 brought into a smooth plane surface.

As best shown in Fig. 6, the rotor 69 is provided with a multiplicity of parallel-walled longitudinal radial slots 80, 81, and 82, there being, in the example shown, three of said slots. The bottom of these slots, as clearly indicated, are semi-cylindrical and their depth is somewhat greater than the diameter of a set of longitudinal cylindrical beaters 83, 84, and 85. These beaters will preferably be formed of hardened steel pipe with the outer surface turned to a true and smooth cylinder substantially the diameter of the distance between the parallel walls of slots 80, 81, 82. The tubes will be filled with some heavy metal, preferably lead, as shown at 86, Fig. 6, to give them mass for a certain response to centrifugal action which is called for.

Since the rotor 69 is of smaller diameter than the interior of the rotor 57, with the rotor 69 eccentrically mounted as shown, there will be left a crescent-shaped chamber or space 87 into which the several beaters 83, 84 and 85 will be caused to move by centrifugal force to engage with their smooth cylindrical walls the smooth cylindrical inner wall 58 of cylinder 57. To the bottom of each of the cylindrical beaters 83, 84, and 85, at its axial center, is mounted a single ball bearing 88, Fig. 5, which is set in a socket formed in a plate 89 closing the lower end of the lead-filled tube beater 83. These balls support in a manner permitting free movement thereof upon the smooth surface of bottom plate 88 each of the several beater cylinders 83, 84, 85.

The top of these beater cylinders, as clearly shown in Fig. 5. rests substantially flush against the bottom surface of the upper rigid plate 77. It follows that, as the beater cylinder 69 is rotated, which will be at considerable speed, say from 900 to 1500 R. P. M., centrifugal force will continually hold upon the inner wall 58 of cylinder 57, the beater cylinders 83, 84 and 85. These beaters then will successively divide the space 87 into parts or separated chambers, one of which, as indicated at 90, is a continually expanding chamber, and another, as indicated at 91, is a continually contracting chamber.

Air from the water evaporating tank 10 will go through a passageway 92 into the chamber 67 and spill over the top of partition 65 into the chamber 63 from which through the openings 59, 61 it will enter and fill the successively formed expanding chambers 90. At the same time the air which has been so drawn in to fill the contracting chambers 91 will be forced out of the openings 60, 62 against external air pressure and into the chamber 64 from which it will be forced over the upper edge of partition 66 and down through chamber 68 and an opening 139 in the bottom thereof, which opening will pass through the floor of the car to the out-of-doors.

By this means a condition of vacuum or negative pressure will be progressively built up in the chamber 10 above the water line 17, which will produce rapid evaporation of the water and ultimately boiling. When, however, the degree of vacuum passes a certain predetermined point at say somewhere between three to seven pounds per square inch, the valve 45 will relieve that negative pressure, at the same time drawing in any condensed water which may have accumulated in sump 43, by drawing into the tank chamber 10 a requisite amount of fresh air. To prevent the passage of water through passageway 92, a series of scrubber baffles 93 is provided in the upper part of the space of tank 10, some of which dip below the surface of the water and prevent water splashing up to go through the channel 92. The rate of flow of air and of water vapor will, of course, be relatively slow and there will otherwise be little tendency to carry water with it.

The result of rapid evaporation of water in the water evaporating tank 10 will, of course, as is well known, be withdrawal of heat from the water itself and from all parts contacted by the water, that is, the walls 11, 12, 13 and 14, of tank 10, the walls 18, 19, 20 and 21, of the air passageway up through said tank, and the walls and fins of the sets of tubes 22 and 23. By these means the heat of the air drawn through and over these surfaces by the blower of fan 39 will be exchanged to the water within the tank 10 and the moving air correspondingly cooled, which being circulated in the compartment of the automobile will to the same degree cool the air in such compartment even under conditions of high external temperature. As already pointed out, when evaporation of the water in tank 10 drops the level to a point somewhat below a predetermined level as at point 17, the float valve 49 will be opened and air pressure upon the water in the tank 47 will inject water into the tank until the level is raised sufficiently to close the valve.

It will be noted that the beater members 83, 84, 85, formed as indicated, are of a diameter such that when fully out of their slots as is indicated by cylinder 83 in reference to slot 80 on Fig. 6, a diameter of said members will pass a little inside of the margins of the slots, thus always effecting a seal with the walls of said beaters. It is also true that the support for the cylinders at the bottom is in effect an axial support which permits the rollers to rotate in contact with the inner wall 58 of cylinder 57 and thus reduces friction to a minimum. The fact that these cylinders are weighted with lead gives a very strong pull of centrifugal force and will definitely hold the contacting elements of the cylinder against the smooth cylindrical surface 56.

In order further to decrease friction and also to form an oil seal, I provide a system of oiling which will now be described. First, the thrust bearing 73 will operate in a closed chamber 94, Fig. 5, which will be filled with oil and sealed in at the factory, although the sealing screw 95 may be carried to the outside of casing 54 or an opening be made through casing 54 to reach said sealing screw so that under requisite conditions additional oil may be added. Upon the driven shaft 70 is mounted a spur gear 96 which forms a couple with a spur gear 97 which together constitute a rotary gear pump positioned within a pump chamber 98 in base casting 99, Fig. 7. Oil is introduced within the cylinder 57 over the plate 75 until it flows out of bottom holes 59 and 60, Fig. 4, leading through the wall of cylinder 57 at a level indicated at 138 Figs. 2 and 4, thus leaving a pool of oil over bottom plate 75 of a substantial depth, as indicated in Fig. 2 at 138. This oil flows into the spaces 63 and 64 adjacent the partitions 65 and 66 and from there gravitates through ports 100 and 101 into a space 102, Fig. 4, above the base casting 99, Figs. 4 and 7. From there it flows through a port 103 into the pump chamber 98 from which it is forced through a port 104, Fig. 7, through pipes 105, 106, and 107, to a point above the upper plate 78. The pipe 107 is carried in a right angle turn 108 through the top of plate 77 and forms a port 109, Figs. 3 and 7, which discharges over the rotor 69 in an annular line above the top limits thereof and upon the tops of the cylinder beaters 83, 84, and 85, as they reach their most protracted position, all as clearly shown in Fig. 5.

From this it will be seen that a layer of oil is constantly spread upon the tops of beater cylinders 83, 84, and 85, and upon the top of intervening portions of the rotor 69. This not only forms a sealing layer upon those tops which prevents cross passage of air as it is being compressed or from the atmospheric pressure which exists in chambers 64 and 68, but the oil also splashes out into the slots 80, 81, and 82, covering their walls with oil and also will be thrown upon the inner wall 58 of stationery cylinder 57, with the result that all contacted parts of the rotor and beaters on the one hand and of the inner cylinder wall 58 on the other will be constantly filmed over with a layer of oil. The excess oil will gravitate down the slots 80, 81, and 82 to the space at the bottom and thence through bottom openings 59 and 60, into the spaces at the bottom of passages 63 and 64. Also oil which passes through openings in the wall of cylinder 57 will first go against partitions 65 and 66 and will likewise gravitate to the bottoms of passages 63 and 64, and from there through openings 100 and 101 to collection chamber 102, and thence through port 103 into the gear pump at the bottom where it will be re-circulated. In this manner as the balls 88 on the bottom of cylinders 90 roll over the hard surface of the bottom plate 75 at the same time permitting the cylinders 83, 84, and 85 to spin or turn about their longitudinal axes and move in and out of the slots, there is maintained at all times lubrication and sealing of all contacting relatively moving parts.

A means of driving the rotor is shown in Figs. 2 and 5. A beveled gear 110 is mounted on the lower end of shaft 70 where the same has been carried through the floor 111 of the automobile in which the apparatus is mounted. A shaft 112 is mounted upon bracket bearings 113, 114 and 115 and may be provided with customary universal joints if that is necessary. There may be substituted on the drive shaft of the gas engine 116 a double pulley 117 in place of the usual single pulley for driving the fan belt 118. A belt 119 will drive the pulley 120 and the shaft 112 has a gear 130 meshing with a bevel gear 110 which will in turn drive the shaft 70 and the parts connected therewith. The fan belt 40 is driven by the pulley 122 on the top of the shaft extension 71.

A form of clutch means 121 controls operation of shaft 112. The clutch is operated by a forked lever 122 pivoted on a bracket at 123 and controlled by a pull lever 124 going to the dashboard.

The particular form of rotating the exhauster member shown in Fig. 6 is a preferred form because of its simplicity and its substantially complete avoidance of frictional losses. But the invention is not to be construed as being limited to that form of exhauster, as any form of exhauster wherein the air will be withdrawn from the evaporating chamber to produce a sufficient degree of vacuum to cause the water therein to boil and absorb heat rapidly lies within the scope of my invention.

A somewhat different form of accomplishing this result is shown in Fig. 8. As so shown, the outer cylinder 57, its openings 61 and 62, and the rotor 69 are, or may be, substantially the same as in the form shown in Fig. 6. In this form, however, longitudinal slots 140 and 141 are formed in the rotor 69 in parallel relation but offset from the axis of the rotor. These slots extend into larger slots 142 and 143, Fig. 8. The compressor members comprise rod-like heads 144 which may be made from sheet metal rolled upon itself. The heads may be filled with lead as at 145, and comprise straight wings 146 which are guided in the slots 140 and 141, the respective heads being turned in opposite directions as shown in Fig. 8. The oiling of these members will be done in exactly the same way as is illustrated in Figs. 4 and 5. In this form of exhauster there will be but two pockets 87 instead of three such pockets as indicated in Fig. 6.

In operation of this form of the invention, the members 144 do not rotate but slide back and forth in the slots 140, 143 and 141, 142. In this form also the members 144 will be supported at their bottoms by one or more ball bearings such as is indicated at 88. The leading or weighting of the heads 144 and also of the cylindrical beaters 83, 84, 85, may be applied only to the central part of the inner tube which gives it greater weight for centrifugal action at the center rather than at the ends. This will have an effect of certainly preventing any tilting of these members, which are extended for considerable lengths.

The advantages of my invention will appear from the foregoing description. The principal advantage is in a means for cooling air, of a very compact form and design, wherein the cooling is produced by causing the production of a high degree of vacuum in a vessel containing water so the water contained therein is caused to boil in rapid vaporization with the result that heat is taken from the water itself and the heat exchange surfaces contacted by the water, in combination with simple means for drawing air from the compartment being cooled over said heat exchanger surfaces and discharging it as cooled air back into the compartment.

A second great advantage is that as water is withdrawn by vaporization from the evaporating tank the differential pressure between outside atmosphere and the air within the tank through the medium of a float valve having pipe connections with a supply tank will cause automatic replenishment of the water as exhausted.

A further great advantage of my invention resides in the fact that water which condenses on the heat exchange surfaces will gravitate into a sump, and when pressure within the tank falls to a maximum low point, a pressure relief valve will open permitting first injection of accumulated water into the tank and then sufficient air to relieve excessive differential pressure.

A further and primary advantage resides in the particular form of withdrawing air from the evaporator tank to produce a desired degree of negative pressure within the evaporator chamber. This comprises radially movable weighted rollers or rods which are held by centrifugal force against the inner walls of an exhauster cylinder and are caused to rotate along side walls in an axial path eccentric to the axis of the rotator, and which are rested upon one or more ball bearings so that they may both slide and rotate freely, and which at the same time are continuously oiled on all of their surfaces whereby frictional loses are substantially eliminated.

A further great advantage of the invention resides in the fact that all parts of the apparatus are enclosed in a single casing of such a relatively small size that it may be rested upon the floor of an automobile, preferably just back of the front seat, or in some other position within the automobile compartment, as, for example, upon the shelf back of the rear seat. There are no pipes in the compartment or conduits for air except the short conduit which runs directly through the floor of the automobile, and the water connection also running through the floor of the automobile for supplying added water to the evaporating chamber as evaporation proceeds.

As heretofore pointed out the invention may be used in any association where it is desired to produce cooled air for air conditioning. But the principal advantage of the invention resides in the fact that it is peculiarly adapted for providing a cooling air conditioner for use in the compartment of automobiles.

I claim:

1. A cooling air conditioner, comprising a small compact casing adapted to be positioned upon the floor of an automobile, a tank formed within and supported by the casing and having its walls spaced from the walls of the casing to form a set of passageways about the tank, said tank being adapted to hold a body of water contacting the insides of the tank walls of said passageways, means mounted in the casing for exhausting air from said tank and discharging it through the automobile floor to cause the water therein to vaporize rapidly and thereby to effect cooling thereof and of the external surfaces of said tank walls, and means in the casing to cause the air to enter the passageway from under the tank and to be discharged from the passageway and casing over the top of the casing.

2. A cooling air conditioner, comprising a small compact casing adapted to be positioned upon the floor of an automobile, a tank formed within and supported by the casing and adapted to contain a body of water, a passageway extending vertically through the body of the tank open at top and bottom and having its walls contacted on their insides by the water in the tank, means mounted in the casing for exhausting air from said tank and discharging it through the automobile floor to cause the water therein to vaporize rapidly and thereby to effect cooling of the external surfaces of said passageway, and means in the casing to cause the air to enter the passageway from under the tank and to be discharged from the passageway and casing over the top of the tank.

3. A cooling air conditioner, comprising a small compact casing adapted to be positioned upon the floor of an automobile, a tank formed within and supported by the casing and adapted to contain a body of water, a passageway extending vertically through the body of the tank open at top and bottom, a series of heat exchange pipes extending across the passageway, the walls of the passageway and of the pipes being contacted on their insides by the water in the tank, means mounted in the casing for exhausting air from said tank and discharging it through the automobile floor to cause the water therein to vaporize rapidly and thereby to effect cooling of the external surfaces of said passageway and pipes, and means in the casing to cause the air to enter the passageway from under the tank and to be discharged from the passageway over the top of the tank.

4. A cooling air conditioner, comprising a small compact casing adapted to be positioned upon the floor of an automobile, a tank formed within and supported by the casing and adapted to contain a body of water, a passageway extending vertically through the body of the tank open at top and bottom, two sets of heat exchange tubes extending obliquely across the passageway in opposite directions respectively, the inside walls of the passageway and of the tubes being contacted by the water in the tank whereby as the water warms in the tubes it will circulate to keep the tubes filled with cold water, means mounted in the casing for exhausting air from said tank and discharging it through the automobile floor to cause the water therein to vaporize rapidly and thereby to effect cooling of the external surfaces of said passageway and tubes, and means in the casing to cause the air to enter the passageway and casing from under the tank and to be discharged from the passageway and casing over the top of the tank.

5. A cooling air conditioner, comprising a small compact casing adapted to be positioned upon the floor of an automobile, a tank therein formed within and supported by the casing and adapted to contain a body of water with an air space above it, a chamber in the casing having connection with said air space above the surface of the water in the tank, means in the chamber including a vertically held rotor formed with radial slots and with vertical rods held for radial movements in said slots, said rotor being eccentrically positioned to rotate within the cylinder for exhausting air from the tank to cause cooling of the water by evaporation, means for effecting discharge of the exhausted air from the bottom of the chamber through the automobile floor, and a ball bearing on the lower end of each of said rods for sustaining the thrust of the rods.

6. A cooling air conditioner, comprising a small compact casing adapted to be positioned upon the floor of an automobile, a tank formed within and supported by the casing adapted to hold a body of water and having its walls cooled by the water in the tank, means mounted in the casing for exhausting air from said tank and discharging it through the automobile floor to cause the water in the tank to vaporize rapidly and thereby to effect cooling of the external surfaces of the tank walls, means in the casing to cause the air to circulate over the cooled surfaces of said walls and to be discharged from the top of the casing, and means including a float valve in the tank and a tank of water independently carried on the automobile under normal air pressure connected therewith for effecting refilling of the tank by air pressure only whenever its level falls below a predetermined point.

7. A cooling air conditioner, comprising a small compact casing adapted to be positioned upon the floor of an automobile, a tank formed within and supported by the casing adapted to hold a body of water and having its walls cooled by the water in the tank, means mounted in the casing for exhausting air from said tank and discharging it through the automobile floor to cause the water in the tank to vaporize rapidly and thereby to effect cooling of the external surfaces of the tank walls, means in the casing to cause the air to circulate over the cooled surfaces of said walls and to be discharged from the top of the casing, means for accumulating water condensed upon said surface, and means including an air release valve in the tank and a connection therefrom to the accumulated water for effecting transfer of said water by air pressure into the tank whenever air pressure in the tank falls below a predetermined point.

8. A cooling air conditioner, comprising a small compact casing adapted to be positioned upon the floor of an automobile, a tank formed within and supported by the casing adapted to hold a body of water and having its walls cooled by the water in the tank, means mounted in the casing for exhausting air from said tank and discharging it through the automobile floor to cause the water in the tank to vaporize rapidly and thereby to effect cooling of the external surfaces of the tank walls, means in the casing to cause the air to circulate over the cooled surfaces of said walls and to be discharged from the top of the casing, and means for replenishing water of vaporization discharging from the tank which consists of a float valve in the tank and a tank of water independently carried on the automobile under normal air pressure connected with the float valve operative whenever the water level falls below a predetermined point and means including a pressure valve in the tank and tube running therefrom to the accumulated water for transferring said water into the tank whenever the pressure in the tank falls below a predetermined point.

9. A cooling air conditioner, comprising a small compact casing adapted to be positioned upon the floor of an automobile, a tank formed within and supported by the casing adapted to hold a body of water and having its walls cooled by the water in the tank, a fan in the casing to cause the air to circulate over the cooled surface of said walls and to be discharged from the top of the casing, means mounted in the casing for exhausting air from said tank and discharging it through the automobile floor to cause the water in the tank to vaporize rapidly and thereby to effect cooling of the water and the external surfaces of the tank walls, said means including a vertical shaft adapted to extend through the floor of the automobile and to be connected with a driven part of the automobile power plant, and means in the casing driven by said shaft to operate the fan.

10. A cooling air conditioner, comprising a small compact casing adapted to be positioned upon the floor of an automobile, a tank therein formed within and supported by the casing and adapted to contain a body of water with an air space above it, a chamber in the casing having connection with said air space above the surface of the water in the tank, means in the chamber including a vertically held rotor formed with radial slots and with vertical beaters held for radial movements in said slots for exhausting air from the tank to cause cooling of the water by evaporation, an oiling system having a pump and connections for taking oil from about the bottoms of the rotor and rods and discharging it upon their tops, means for permitting return of the oil to the pump including means for accumulating a layer of oil about said bottoms, means for operating the rotor whereby air is exhausted from the tank and the water therein is cooled by evaporation, and means for moving air through the casing in heat exchange contact with the walls thereof.

FRANK A. WHITELEY.